Aug. 24, 1948.                    R. J. HARDY                    2,447,502
                      SYSTEM FOR RADIO DIRECTION FINDING
                              AND SIMILAR PURPOSES
Filed Nov. 27, 1941                                      3 Sheets-Sheet 1
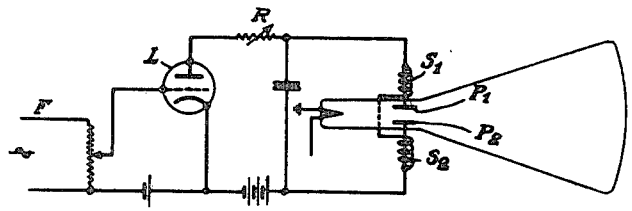
FIG.1
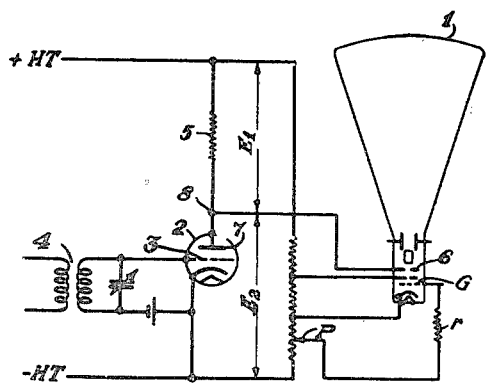     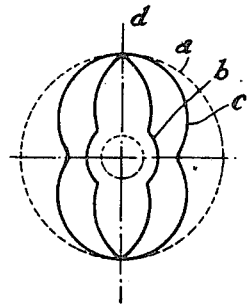
FIG.2              FIG.3
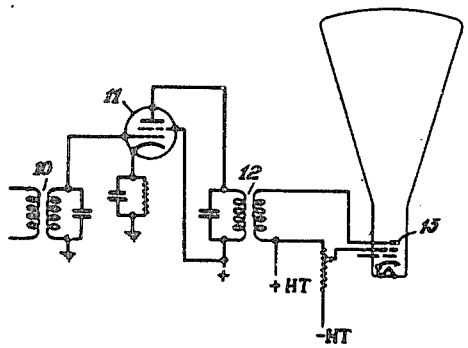     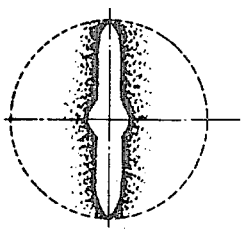
FIG.4              FIG.5
INVENTOR
RENÉ J. HARDY
BY
*Edward D'Kinney*
ATTORNEY Patented Aug. 24, 1948

2,447,502

UNITED STATES PATENT OFFICE 2,447,502

SYSTEM FOR RADIO DIRECTION FINDING AND SIMILAR PURPOSES

René Jean Hardy, Paris, France, assignor to International Standard Electric Corporation, New York, N. Y., a corporation of Delaware Application November 27, 1941, Serial No. 420,655
In France April 20, 1940

Section 1, Public Law 690, August 8, 1946
Patent expires April 20, 1960

5 Claims. (Cl. 343—118)

The present invention relates to phase indicating devices and in particular to radio direction indicating devices that furnish directly on a cathode ray oscillograph an indication of the direction of a radio transmitting station.

For indication of the phase, it is necessary to bring about two conditions, namely, a circular displacement of the spot, for example, and the accompaniment of a second phenomenon that marks the indication of the phase angle at a given point of the path of travel of the spot. In order to do this, it is customary to oblige the spot to describe a circle and to bring back the spot toward the center on occurrence of each periodic phenomenon. It is furthermore very frequently necessary to cut off the image from the spot when the image does not help to make the indication of phase more legible.

The invention relates to a method of phase indication with continuous displacement of the spot and with deviation in a plane different from that of the displacement of the spot, e. g., a rectangular one, in order to produce a visual indication of the phase. For certain uses, the light of the spot is only made to appear when necessary.

According to certain characteristic features of the invention, a radio direction finder with a cathode ray indicator may comprise a radial modulation that permits of obtaining an indication in the form of an easily legible line or a spiral-form displacement of the cathode ray that will furnish a radial indication by illumination of certain points of the spiral, or else this indication may be obtained in the form of a dark line on a luminous background.

These various features and others as well are explained hereunder for a certain number of embodiments given without limitation. Reference is made to the drawings, in which Fig. 1 illustrates a device for circular scanning with radial modulation;

Fig. 2 illustrates a circuit that produces the radial modulation;

Fig. 3 shows an example of a radio direction finding image;

Fig. 4 illustrates a symmetrical radial modulation circuit;

Fig. 5 shows an image that corresponds to the preceding diagram;

Figure 6:
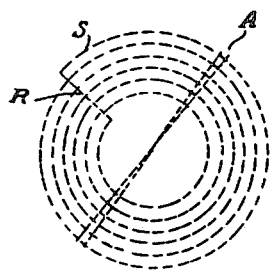
Fig. 6 illustrates a scanning pattern.

Referring to the drawings, let us assume that the invention is applied, for example, to a radio direction finding device that comprises a rotating frame aerial or a finder, i. e. a coil that rotates in the field of coils fed by two frame aerials or antennas of the Adcock type, or one frame aerial or one antenna, etc. . . .

The finder may be driven continuously by a motor that also drives a generator of reference current in the well known manner or else a static device that gives equivalent results.

If the generator is a two-phase generator, rotation of the spot is obtained very easily by feeding these currents to the two pairs of plates of the oscillograph or to two perpendicular coils. If the reference current is a single phase current, use can be made of the well known device for feeding plates by quadrature voltages taken at the terminals of a resistance and a condenser in series, or else the device shown in Fig. 1 which does not require the quadrating of two sine curves.

In this Fig. 1, the tube L is connected on the one hand to deflecting magnet coils S1, S2 and, on the other hand, to two deviation plates P1, P2. The effects produced by the deflecting plates and coils on the cathodic beam are rectangular, as the plates act by voltage and the coils by intensity. If a low sinusoidal voltage is applied at F, the circle is produced directly by the phase-displaced action of the plates and the coils. The variable resistance R permits of an adjustment that furnishes a perfect circle.

The signal F that is received by the finder is utilized to act on the tracing of the spot, which would otherwise be circular, and produce a deviation that indicates the direction of the received waves.

Fig. 2 illustrates an example of an embodiment in which a radial modulation is obtained by variation of the anodic voltage of the outer anode of the cathode ray tube that is controlled by the phenomenon to be observed. The speed of the electron that leaves the cathode corresponds to a charge which is variable according to the voltage that is applied to the second anode, and the angle of deviation when it passes between the plates is a function of this anodic voltage. Variation of the voltage of the outer anode is produced, and in this way a variation of the angle of deviation is effected.

In one of the embodiments of the invention, use can be made of a resistance shunted across the circuit of the second anode. By causing variations of this resistance, the voltage can be modified very considerably. This variable resistance may consist of the internal resistance of a triode that is modulated between grid and cathode by the signal.

According to the arrangement shown in Fig. 2, the spot oscillograph 1 describes a circle under the action, for example, of a two-phase alternating current generator located on the same shaft as the rotating frame aerial or the finder (not shown).

Tube 2 is connected by its grid 3 to the mean frequency circuit of the receiver, e. g. by means of the tube transformer 4. The tube is connected in series with resistance 5 across the positive and negative high voltage which may be 700 volts, for example. The negative polarization of grid 3 is such that the operating point of the tube is just in front of the parabolic part of its characteristic.

In the absence of a signal, the internal resistance of the tube is very high and the anode 6 that is connected to plate 7 of the tube is brought to a very high potential owing to the ratio of the resistances of the virtual potentiometer that is formed by resistance 5 and the internal resistance $r$ of the tube. When there is no signal, the value of the resistance 5 is selected low with respect to the resistance $r$ of the tube. With conventional tubes, such as a pentode, a 700 volt feed can supply a voltage of 640 for a 1 megohm value of resistance 5. When a signal is applied to grid 3, there occurs a rapid variation of the internal resistance which rapidly attains a value of 1 or 2 megohms and much less in proportion as the signal increases. The voltage of anode 6 drops rapidly. This is due to the particular conditions of use and more especially to the use of a very high feeding voltage and of the distortion that occurs in the voltage applied to anode 6.

When there is no signal, $r$ is very great and anode 6, which is connected to 8, has with respect to the negative pole a high voltage that is produced by the potentiometer E1, E2. When a weak signal is applied at 3, there occurs a rapid variation of the internal resistance and a value of several megohms is very soon obtained. According as the signal increases, E2 becomes considerably lower. The phenomenon of reverse modulation can be produced by connecting the plate directly to high voltage, with the resistance on the negative side. The variation caused by the modulation is not a linear replica and, if use were made of a connection stage, e. g. by capacity, there would be an important production of harmonics, but the anode of the cathode tube is modulated directly and the shape of the distortion is, on the contrary, very advantageous; its effect is to modify the shape of the image as shown in Fig. 3. It is equally possible to modulate 3 by means of a variable direct voltage such as that of the detection of a signal, for example.

The circle has been transformed into an image $b$ for which the current minima determine the wanted direction (Fig. 3).

Neither does the modulation of anode 6 correspond to a linear displacement of the spot toward the center, and it very rapidly attains the form of a circle which determines the saturation of the modulation of the anode.

Curve $c$ represents the normal image for a weak signal, and it can be seen that the reading is made easier. The advantageous feature of this method is the rapid action of the radial deviation for the weakest signal.

In one variation of this embodiment, there is applied in series with the high voltage source a self-indication circuit which is fed by a tube that amplifies directly the modulation of the amplifier. There is then obtained a radial modulation which gives a luminous surface having a black interior contour that corresponds to an image giving the direction. Since this luminous surface is produced by high frequency sine curves, the parasitic disturbances have a less luminous effect. It must be noted that, owing to the trajectory of the radial spot being sinusoidal, the tangential velocity is much less at the ends of the sine curves, and the black on white image will be surrounded by a zone that is more luminous and better defined than the rest of the illuminated surface.

Fig. 4 shows the application of this variation of embodiment to the known radio direction device that employs rotating resistance generators.

In this Fig. 4, transformer 10 connects tube 11, which acts as an amplifier tube, to the output of the mean frequency amplifier, and a tuned or untuned self-induction or transformer 12 is located in series in the circuit of the outer anode 13.

While the spot is being displaced circularly by the alternating reference voltage generator, there is obtained a radial modulation which furnishes a luminous surface having a black interior contour that corresponds to the image of the direction, as shown in Fig. 5.

When, in phase indicators, the spot returns toward the center, it is no longer indispensable to keep the grid of the cathode tube negative, and, for facilitating the indication direction, it is preferable to reinforce the luminous part which faces outwardly, for example.

In the example of embodiment described hereunder, the radial modulation is completed by a cutting-off of the illumination of the spot.

Let us take the case of a luminous spot turning in a circle on the screen of the cathode tube and then apply to the anodic modulation, not the detected envelope curve of the static or non-static rotating finder but a sawtooth relaxation voltage, the discharge of which can be synchronized to the frequency of rotation of the finder, for example, though this synchronization is not indispensable for the operation of the device. This double scanning will produce a spiral S (Fig. 6) whose rapid return R, which is invisible, will correspond to the discharge of a thyratron, for example. A fairly rapid frequency of the rotation with respect to that of the relaxation voltage is provided, and this results in the obtaining of a uniformly luminous corona.

The detected modulation of the envelope curve is then applied to the control grid of the indicating cathode beam. There is then obtained an illumination of the spot each time that the minimum of the frame aerials corresponds to the direction of the transmitter. The corona continues to remain extinguished and there only remains a radial line A which gives the direction. Any disturbing parasite (stray) cannot produce an accidental image on the tube, for it helps to extinguish the spot, but since strays only act at very irregular intervals, they will be distributed over a considerable surface even if they do occur.

Figure 7:
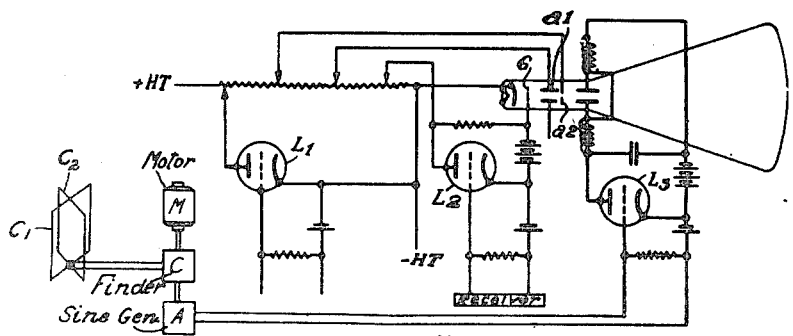
Fig. 7 is a diagram of an arrangement suitable for producing said pattern.

Fig. 7 illustrates an embodiment of a circuit of this kind. The relaxation circuit is that of tube $L_1$. The modulated signal reaches tube $L_2$, the plate of which is connected to grid G of the cathode ray oscillograph, and tube $L_3$ gives the spot a circular deviation over a circuit already described in connection with Fig. 1. Instead of $L_3$, there may also be added a quadrature scanning on the two pairs of plates.

Figure 8:
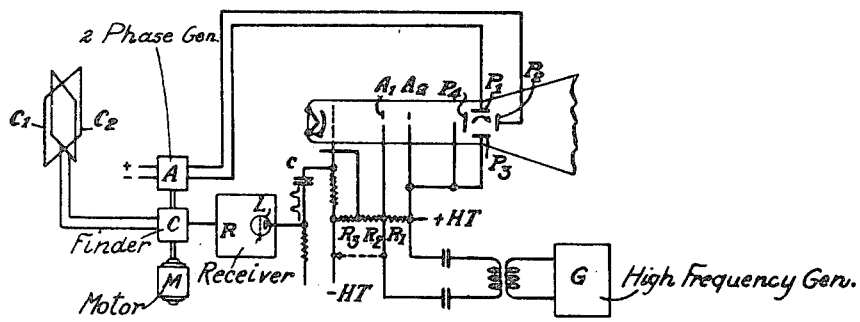
Fig. 8 is a diagram of another embodiment.

Proceeding along the same lines, another variation of the invention consists in superposing on the circular deviation a high frequency radial modulation, shown as an example in Fig. 8. The motor M drives a two-phase alternating current generator A or a rotating resistance system of the type generally used, so as to cause a circular displacement of the spot by means of plates $P_1$, $P_2$ and $P_3$, $P_4$ of the cathode tube. The motor likewise drives the finder C, which is radiogoniometric and which is connected on the one hand to the wave collector, frames or antennas $C_1$, $C_2$ and, on the other hand, to the receiver R which may be of any kind and which gives to the output on tube L a rectified envelope curve having tips $t_1$, $t_2$, $t_n$. The cathode ray indicator is fed on the one hand by means of a direct source of high voltage current and, on the other hand, at the terminals of $R_1$ by a high frequency generator G. When the generator is not in use, the spot describes a circle, but as soon as the generator begins to operate, the spot describes a trajectory of great length, i. e. a sine curve in the radial direction, while the whole is displaced circularly, and this corresponds to a considerable displacement of the spot for a slight angular displacement of the indication.

Figure 9:
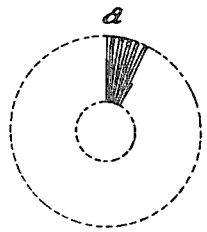
Fig. 9 illustrates scansion features of said embodiment.
Figure 9:
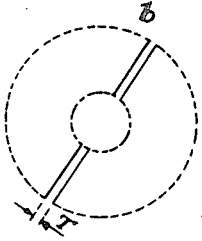
Figure 9:
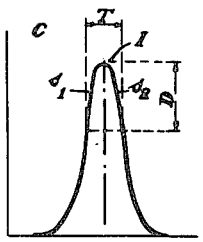

The figure obtained is then a uniform luminous corona as shown in Fig. 9a. Taking into consideration an image obtained in this way, the grid voltage of the cathode ray tube is modulated in such a way that for an amplitude of the detected current of the order of D (Fig. 9c) the spot is luminous, and it is extinguished the rest of the time. The time T is given by the amplification of the system and it may be 1 or 2 degrees. It is furthermore easy to appreciate the circumstances by observing zone I which is much more luminous than $s_1$ and $s_2$.

In reality the spot will be illuminated for a time T that corresponds to a great number of periods of the radial sine curve and, if there are no parasitic disturbances, the radial sine curve will remain illuminated during its entire trajectory. If the emission is very much disturbed, the parasitic disturbances will cause interruptions of light, but the entire phenomenon occurs over a width of 1 or 2 degrees, and even if the parasitic disturbance was of such kind as to suppress three fourths of the complete trajectory, there would remain a little light to form the indicating line T of the direction (Fig. 9b).

It can furthermore be seen that, outside the indicating line of direction, the parasitic disturbance cannot aid in extinguishing the spot which is already extinguished by the modulation outside of the space T, and it will consequently only give rise to illuminations that are dispersed over the rest of the screen.

It is known that the luminosity of the signal can be varied by utilizing positive or negative alternations of the detection; the operating point of the grid characteristic of the cathode tube can accordingly be adjusted in such a way as to only make the image appear at the moment when it is wanted.

It is likewise possible to superpose two different phenomena and only illuminate the spot when the diameter of the circle attains a determined value and then extinguish it for any value of the diameter below a given value.

Figure 10:
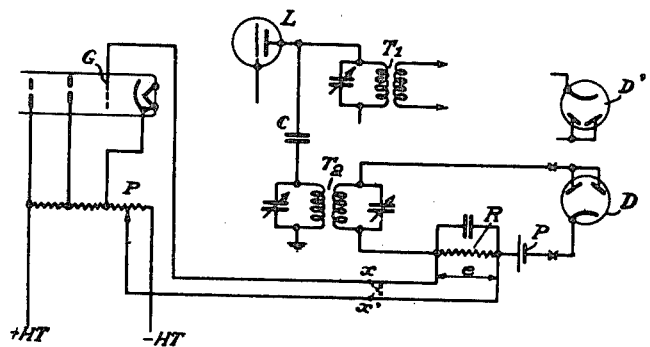
Fig. 10 illustrates a means for modulating the grid for the purpose of causing the appearance or disappearance of the illumination of the spot at a given point.

In Fig. 10 there is shown an assembly that permits extinguishing of the spot when it is at the center in the cathode ray indicators by utilizing, for example, a detection envelope curve that is saturated so as to deform toward the center the circle that is described by the spot. As a matter of fact, the image obtained with the use of the devices that have just been described is not of uniform brilliancy, because the luminosity at a given moment is a function of the velocity of displacement of the cathode spot.

In particular, the central portion, which corresponds to weak rays and consequently to slow displacements, is highly luminous. The brilliant splotch that is thus obtained at the center of the screen diffuses a great deal of light and is troublesome. It is proposed according to the present invention to bring about an extinction of the spot at the central part of the screen in order to make the image more correct and more uniform, and this is moreover practically indispensable in the examples of embodiment described hereabove (Figs. 2, 4, 7, etc.).

In the example of embodiment shown in Fig. 10, the detected modulation that reaches tube L serves for forming the image according to any method by means of the connection transformer $T_1$. By means of the low value condenser C that is connected to the plate of tube L, which may be the last tube of an intermediate amplifier, mean frequency voltages may be taken which are similar to those transmitted over the image circuit that is detected on a diode D, the detection resistance R of which is in series in the cathode tube control grid circuit. The voltage $e$ that is thus obtained aids to modify the closed circuit voltage of the cathode tube control grid G.

There is thus obtained lessening of the luminosity for slow displacements of the spot, i. e. for weak rays, and extinction at the center by suitable arrangement.

The potentiometer P serves for regulating the resting position of the spot.

According to the phase of the detection, use may be made of the connection of the diode, or else the reverse connection. Resistance R may be potentiometric.

According to the polarity of the signal, and if extinction at the center or at the outside is desired, the branching of the detected circuit is reversed, or else the connections $x$, $x'$.

Figure 11:
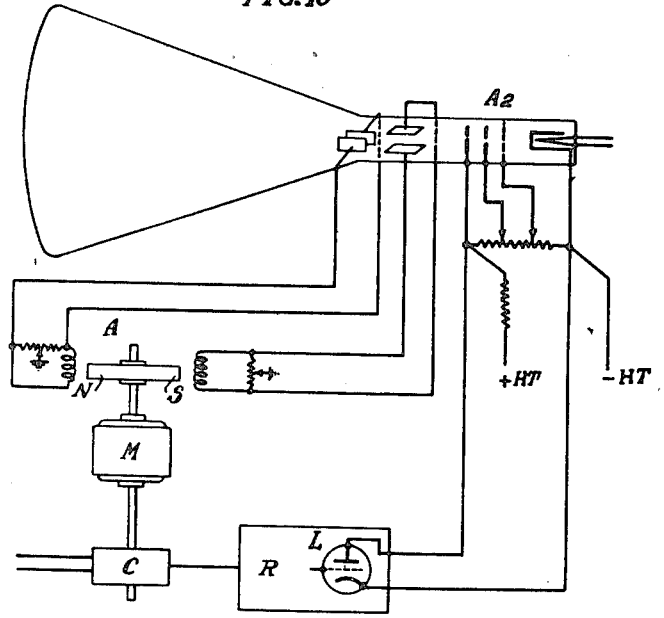
Fig. 11 is a diagram of a further embodiment.

It is to be noted that a circle produced by any means can be modulated radially and in particular according to the example hereafter (Fig. 11).

Figure 12:
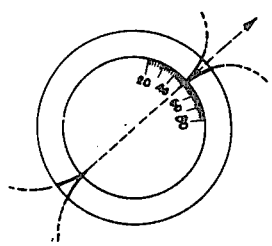
Fig. 12 illustrates an indicating dial construction.

The apparatus consists of a radio direction finder C to which the two conventional frame aerials or antennas are connected. For example, the motor M drives the finder C and an alternator A which produce two-phase currents that serve directly for the production of the circular image. The receiver R comprises an output tube L which receives on its suitably polarized grid the modulation that proceeds from the diode detection, for example, and its plate circuit consists of the feed resistance, or part of the feed resistance, of the outer anode $A_2$ of the cathode ray tube. The modulation of the anode current of the cathode ray tube, which may moreover be effected according to one of the other variations that have been explained, is brought about by modulation of the internal resistance of the output tube L. According to the direction of the modulation, there are obtained two peaks which correspond to the reception minimum of the frame aerials, the rest of the modulation being shifted to the outside of the screen. By reversing the modulation, deviation toward the center is obtained. Fig. 12 illustrates the figure obtained on the screen by shifting the modulation toward the outside.

Although the invention has been described for certain examples of embodiments, it is evident that it is by no means restricted to the same and that these are capable of numerous variations without departing from its scope.

What is claimed is:

1. In a direction finder, rotatable radiation direction sensing means, means for rotating said sensing means, a cathode ray indicator including a screen for displaying a luminous spot responsive to said cathode ray, means for rotating said cathode ray relatively to said screen and synchronously with said first mentioned rotating means, means for deflecting said cathode ray radially back and forth during rotation thereof, and spot controlling means responsive to waves from said sensing means for extinguishing the luminous spot produced by said cathode ray and responsive to a minimum of waves from said sensing means for momentarily overcoming said extinguishing effect.

2. In a direction finder according to claim 1, the combination in which said cathode ray indicator includes a grid for controlling the intensity of said cathode ray, said spot controlling means including means responsive to waves from said sensing means for polarizing said grid to extinguish the luminous spot on said screen and responsive to a minimum of waves from said sensing means for removing said extinguishing polarization.

3. In a radio direction finder according to claim 1, the combination in which said means for deflecting the cathode ray radially back and forth includes means for producing a relaxation signal and for varying the cathode ray propulsion voltage in accordance therewith.

4. In a radio direction finder according to claim 1, the combination in which said means for deflecting the cathode ray radially back and forth includes high frequency generator means for varying the cathode ray propulsion voltage.

5. In a radio direction finder according to claim 1, the combination in which said spot controlling means includes receiving means for producing a sharp impulse in response to a minimum of waves from said sensing means and for increasing the intensity of said cathode ray in response to said impulses.

RENÉ JEAN HARDY.

REFERENCES CITED

The following references are of record in the file of this patent:

UNITED STATES PATENTS

| Number | Name | Date |
|---|---|---|
| 2,130,912 | Tolson | Sept. 20, 1938 |
| 2,151,917 | Hyland | Mar. 28, 1939 |

FOREIGN PATENTS

| Number | Country | Date |
|---|---|---|
| 510,394 | Great Britain | Aug. 1, 1939 |